J. & F. L. KINCANNON.
Wheelbarrow.
No. 226,325.　　　　　　　　　　Patented April 6, 1880.
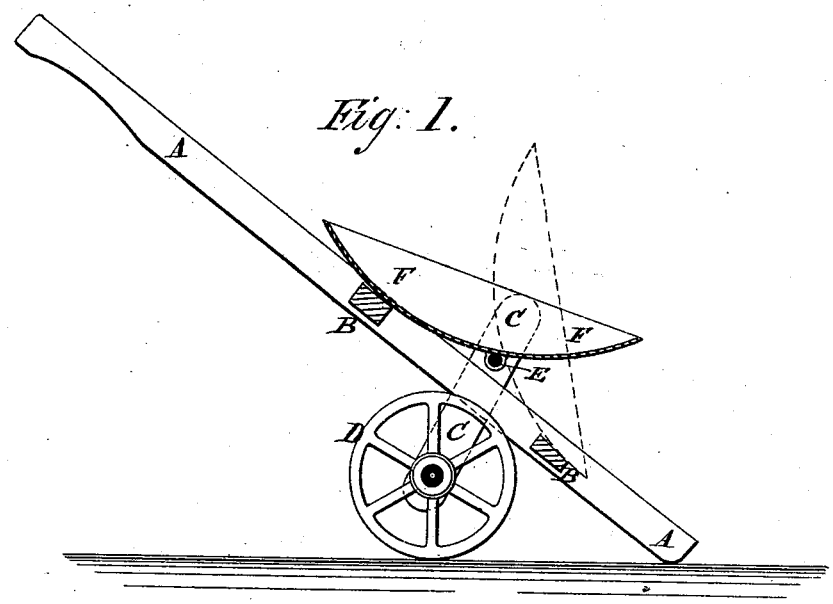
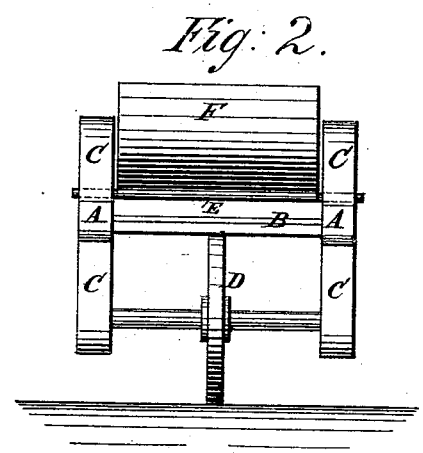
WITNESSES:　　　　　　　　　　INVENTOR:

UNITED STATES PATENT OFFICE.

JAMES KINCANNON AND FRANK L. KINCANNON, OF VERONA, MISSISSIPPI.

WHEELBARROW.

SPECIFICATION forming part of Letters Patent No. 226,325, dated April 6, 1880.

Application filed August 2, 1879.

*To all whom it may concern:*

Be it known that we, JAMES KINCANNON and FRANK L. KINCANNON, of Verona, in the county of Lee and State of Mississippi, have invented a new and useful Improvement in Self-Dumping Wheelbarrows, of which the following is a specification.

Figure 1 is a vertical longitudinal section of our improved wheelbarrow. Fig. 2 is a front view of the same.

Similar letters of reference indicate corresponding parts.

Our invention is an improvement in the class of wheelbarrows whose body is pivoted to adapt it to dump its contents by tilting or turning on its pivots.

The invention consists in the extension of the front end of the frame beyond the wheel and body of the wheelbarrow, so that when said frame is suitably inclined its front end will rest on the ground, and, together with the wheel, constitute a firm support for the pivoted body while being tilted.

A are the side bars of the barrow-frame, the rear ends of which serve as handles, and which are connected near their forward ends by two cross-bars, B. To the side bars, A, between the cross-bars B, are attached the middle parts of two standards, C, to the lower ends of which are pivoted the journals of the wheel D. To the standards C, above the side bars, A, are pivoted the ends of the rod E, to which the body F of the wheelbarrow is attached.

With this construction, when the rear ends of the side bars, A, are raised so as to bring their forward ends to the ground the wheelbarrow will be balanced, and can be readily filled or loaded.

With this construction, when the handles are lowered into proper position to be held in the hands the weight of the load will be so nearly over the wheel that the hands will not have to sustain any more weight than enough to properly balance the barrow.

With this construction, when the barrow has been brought to the place where the load is to be dumped a slight pressure against the upper or rear part of the body F will overbalance the said body and dump the load; or the body may be caused to overbalance and dump the load by giving to the handles a quick upward movement; or the body may be so put on as to be adjustable or removable, and so arranged that the proper distribution of the weight of the load will cause it to be dumped after the removal of a fastening—either a button, hook, or spring—attached to the cross-bar B.

Having thus described our invention, we claim as new and desire to secure by Letters Patent—

The combination of the tilting body of the wheelbarrow with the wheel, over which it is pivoted, and the handles or frame A A, which is extended in front of the wheel to adapt it to rest on the ground when inclined, as shown and described.

JAMES KINCANNON.
FRANK LOCKE KINCANNON.

Witnesses:
J. H. STRAIN,
W. W. TRICE.